UNITED STATES PATENT OFFICE.

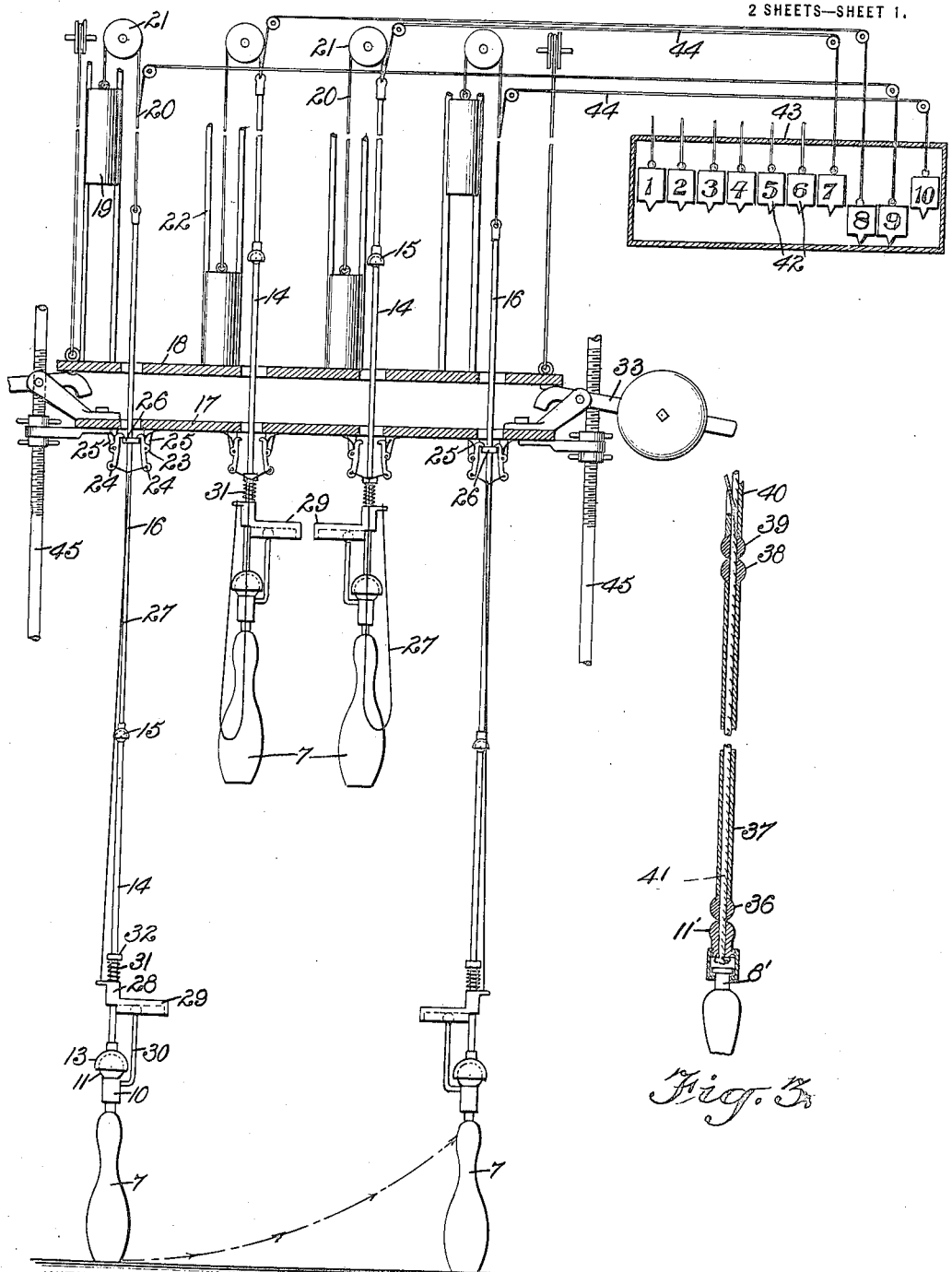

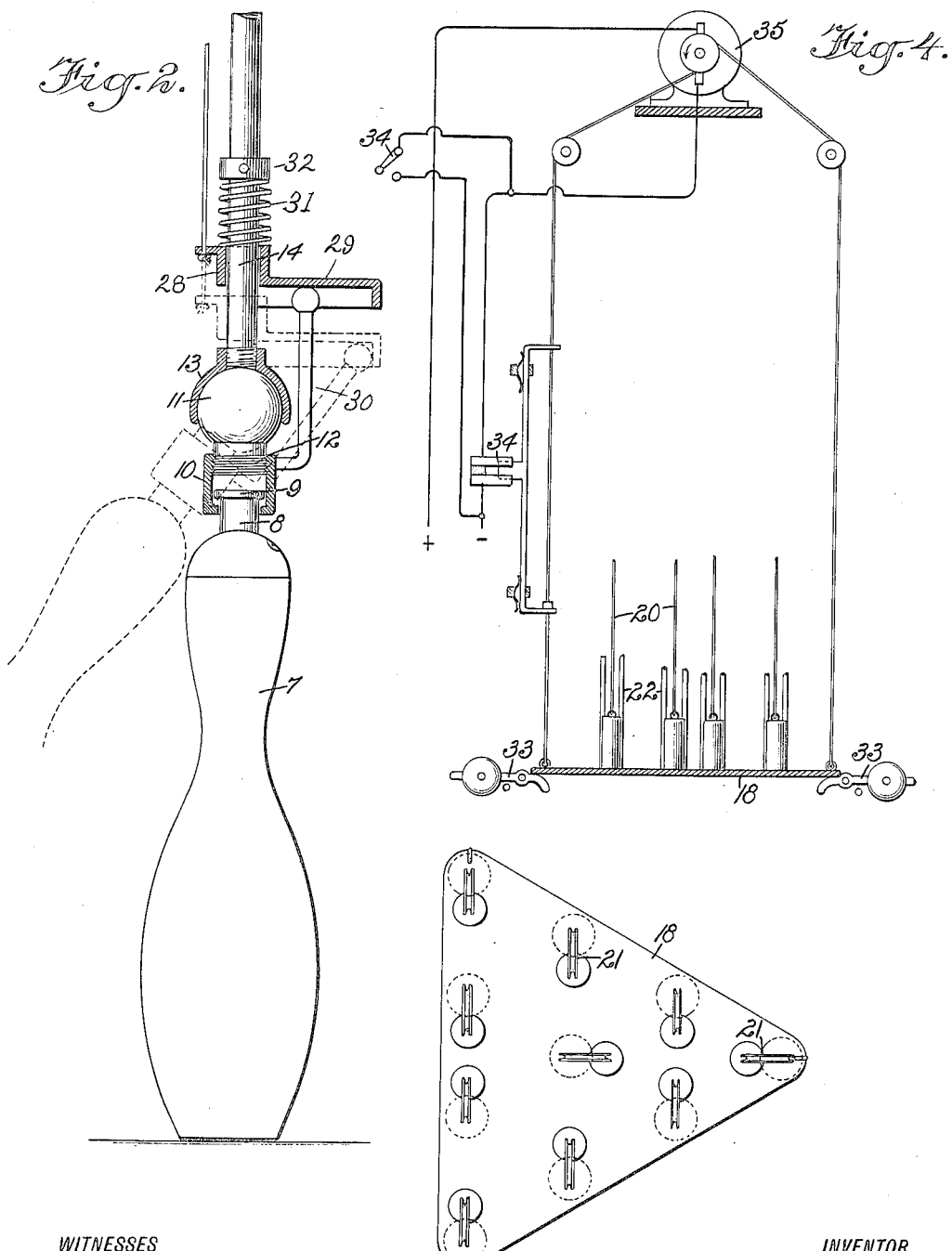

EMIL SCHLOSSBERG, OF BROOKLYN, NEW YORK.

AUTOMATIC PIN-SETTER.

1,225,276.     Specification of Letters Patent.     Patented May 8, 1917.

Application filed August 11, 1916. Serial No. 114,356.

*To all whom it may concern:*

Be it known that I, EMIL SCHLOSSBERG, a subject of the Emperor of Russia, and a resident of the city of New York, borough of Brooklyn, in the county of Kings and State of New York, have invented a new and Improved Automatic Pin-Setter, of which the following is a full, clear, and exact description.

My invention relates to ten-pins games, and an object thereof is to provide a mechanism for automatically resetting the pins.

A further object of the invention is to provide an apparatus whereby the use of the pin boy may be dispensed with.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation in section of a ten-pins game embodying my invention;

Fig. 2 is an enlarged sectional elevation of a pin and release controlling means associated therewith;

Fig. 3 is a modification of the superstructure of the pin;

Fig. 4 is a diagrammatic elevation of the mechanism for setting the pins; and

Fig. 5 is a plan view of the movable platform.

Referring to the drawings, 7—7 are the pins each provided at the top with a stud 8, which stud has a flanged head 9. A cap 10 is free to slide and turn on the stud 8. It is retained on the stud by the flanged head 9. A ball 11 has a threaded extension 12 which engages the cap. A ball socket 13 coöperates with the ball 11, the ball socket being carried by a rod 14, the ball and socket forming the joint between the pins 7 and the rod 14. The rod 14 is in turn joined by a ball and socket joint 15 to a rod 16. Said rod projects through a support 17 and platform 18.

The weight of the pin and rod is overbalanced by a counterweight 19 connected to the rod by a flexible member 20 which passes through a pulley 21. Suitable guides 22 are provided for the counterweights to steady their movement. The movement of the rods by the counterweights is prevented by a locking mechanism 23 mounted on the support 17 adjacent the openings through which the rods project. The locking mechanism comprises two pawls 24 mounted to swing to and from the rod 16. A yielding member 25 is provided for each pawl to move it toward the rod. The rod 16 has a collar 26 which is to be engaged by the pawls when said collar passes below the gripping ends of the pawls.

The coöperating pairs of pawls of each locking mechanism are connected by a flexible member 27 to a slide 28 mounted on the rod 14 in proximity to the ball socket 13. The slide 28 has a lateral arm 29 which engages an extension 30 from the cap 10. The arm is maintained in engagement with the extension 30 by a coil spring 31 provided on the rod 14 between the slide and a collar 32 formed on the rod 14. The spring 31 forces the slide 28 toward the socket 13 when a pin 7 is forced to move in its joint on the rod 14. The displacement of the slide by the spring displaces the pawls from the collar 26 of the corresponding rod and the counterweight 19 will raise the rod and pin to the upward position, as shown in Fig. 1.

The sudden displacement of a pin 7 also causes the displacement of the rod 14 in its joint with the rod 16; consequently the pin is free to move on two arcs, the center of one of which is in the ball and socket joint of the pin and the center of the other of which is in the ball and socket joint 15. The second arc has a radius sufficient to cause the displaced pin to engage any of the pins in proximity thereof when the said pins are in their proper place and in operative position. The sweep of the arc is indicated in Fig. 1.

When all of the pins have been raised, the platform 18 will receive all the counterweights and therewith will accumulate sufficient weight to overbalance the weight-carrying arms 33. The downward movement of the platform closes a switch 34 (see Fig. 4) which starts a motor 35 mounted to raise the platform 18; and when the platform reaches the proper point the switch 34 is opened, breaking the circuit to the motor, thus allowing the platform 18 to return on to the weight-carrying arms 33. A switch 34' is provided for closing the circuit to the motor 35 independently of the switch 34. This switch 34' is used when some pins, but not all, have been displaced. As the counterweights 19 are raised, collars 26 of the rod 16 pass the pawls 24 and are locked in position, preventing the counterweights from descending with the platform. It will be noted that the stud 8 does not carry the weight of the superstructure formed by the rods when the pin sets on the alley.

The support 17 which carries the weight-carrying arms 33 is in turn supported by uprights 45 so that the support may be adjusted thereon to and from the alley. This arrangement permits the utilization of the apparatus with pins of various sizes. It is only necessary to disengage the caps 10 and substitute other pins with similar caps.

The pin 7 is provided with a number 42, all of the numbers being located in a suitable casing 43. Each of said numbers is connected by a flexible member 44 to the corresponding rod 16 of its pin. The casing containing the numbers may be placed in proximity to the players to indicate the displaced pins.

In the modified structure, the ball 11' bears against a ball 36 which is supported by a tubular rod 37 carrying at the other extremity also a ball 38 which bears against a ball 39 provided at the adjacent extremity of the tubular rod 40, which is the equivalent of the rod 16. The ball 11' is also hollowed out so that the flexible member 41 which controls the locking means 23 has one end thereof secured to the balls and the other end to the stud 8' of the pin.

While I have described the principle of operation, together with the device which I now consider to be the best embodiment thereof, I desire to have it understood that the device shown is merely illustrative and that such changes may be made as are within the scope of the appended claims.

I claim:

1. In a ten-pins game, a plurality of pins each suspended independently, means overbalancing each pin, spring-actuated locking means for retaining the suspended pins in their operative position, flexible means connecting the locking means to the corresponding pin whereby the sudden displacement of the pin on its suspension causes the operation of the locking means and the pin is moved from the operative to the inoperative position by the overbalancing means, means for raising the balancing means for placing the pins into operative position.

2. In a ten-pins game, a plurality of pins each suspended independently, means overbalancing each pin, means preventing the displacement of the pins by the overbalancing means when the pins are in operative position, spring-actuated means for operating the means preventing the displacement of the pins, means connecting said spring-actuated means to the corresponding pins to operate said means when the pin is displaced from its operative position, whereby the means preventing the displacement of pins are operated and the overbalancing means becomes effective and moves the corresponding pin to the inoperative position.

3. In a ten-pins game, a plurality of pins, a jointed rod for each pin, a weight overbalancing the jointed rod and pin, automatic locking means for engaging the rod when the pin is in operative position, a flexible member connecting the locking means to the pin so that a sudden displacement of the pin from its operative position actuates the locking means and releases the rod, whereby the weight raises the pin to the inoperative position, a platform for receiving the weights, and means for raising the platform whereby the pins are placed into operative position and said locking means automatically engage the rod, substantially as and for the purpose set forth.

4. In a ten-pins game, a plurality of pins, a jointed rod for each pin, said pin and rod having a jointed connection, a weight overbalancing each rod and pin, automatic locking means engaging the rod when the pin is in operative position, thereby preventing the weight from moving the pins, a flexible member connecting the locking means to the pin for actuating the locking means by a sudden displacement of the pin and rendering the weight operative to move the pin to the inoperative position, and means for raising the weights to place the pins into operative position and bring the rods into engagement with the locking means.

5. In a ten-pins game, a plurality of pins, a jointed rod for each pin, a ball joint between the rod and the pin, a weight overbalancing each rod and pin, automatic locking means engaging the rod when the pin is in the operative position thereby preventing the displacement thereof by the weight, a flexible member connecting the automatic means to the ball joint of the pin with the rod so that the sudden displacement of the pin operates the locking means to release the rod, whereby the weight raises the pin to the inoperative position, means for indicating the displacement of a pin, flexible means connecting said indicating means to the rod of the pin, and means for raising the weights to place the pins into operative position.

6. In a ten-pins game, a plurality of pins, a jointed rod for each pin, a ball joint connecting the rod to the corresponding pin, the joint of the rod being so formed that the displacement of the rod in the joint will allow a displaced pin to engage an adjacent pin which is in the operative position, a weight overbalancing each rod and pin, automatic locking means engaging the rod above the joint and preventing the displacement of the pin by the weight when the pin is in the operative position, a flexible member connecting the locking means to the ball joint so that a sudden displacement of the pin actuates the locking means to release the rod, whereby the weight is free to raise the pin to the inoperative position, and means for raising the weights and lowering the pins to their operative position and to bring said automatic locking means into engagement with the rods.

7. In a ten-pins game, a plurality of pins, a two-section rod having a ball joint between the sections for each of the pins, a ball joint connecting one of the sections to the pin, a weight for overbalancing the rod and pin, automatic locking means for engaging the other section of the rod whereby the weight is prevented from displacing the rod and pin and the pin is maintained in operative position, a flexible member connecting the ball joint of the pin to the locking means so that a sudden displacement of the pin on its joint releases the locking means from the rod section and allows the weight to raise the pin, the section of the rod at the pin being of such a length that the displacement of the pin on the joint of the sections allows the displaced pin to engage an adjacent pin in operative position, and means for raising the weights to bring the locking means into engagement with the corresponding sections of the rods, whereby the pins are placed into operative position.

8. In a ten-pins game, a plurality of pins, a suspension for each pin having two joints therein, one at the junction of the pin with the suspension and the other in the suspension at such a distance that the movement in said joint will cause the pin to engage any of the adjacent pins when they are in the operative position, a weight for each pin and suspension normally tending to raise the pin, locking means engaging the suspension when the pin is in operative position and preventing the weight from displacing the pin, a flexible member connecting the locking means to the pin so that a sudden displacement of the pin on its joint with the suspension operates the locking means to release the suspension and allow the weight to raise the pin, and means for raising the weights whereby the pins are lowered and the locking means are caused to engage the suspension.

9. In a ten-pins game a plurality of pins, a weight for each pin, means connecting the weight to the pin, locking means engaging the connecting means and preventing the weight from raising the pin, a ball joint between the connecting means and the pin so arranged that when the locking means engages the connecting means the weight of the connection is relieved from the pin, flexible means connecting the locking means to the ball joint so that the sudden displacement of the pin on its joint operates the locking means to disengage the connecting means and allow the weight to raise the pin, said connecting means having a joint in the body thereof at such a distance from the ball joint that a suddenly displaced pin may swing in an arc large enough to engage any of the adjacent pins located in the operative position, and means for raising the weight to lower the pins and bring the locking means into engagement with the corresponding connecting means.

10. In a ten-pins game, a plurality of pins, a jointed rod for each pin, a ball joint connecting the pin loosely to the rod, a support through which the rods project, a weight for each pin connected to the rod and tending to raise the pin, locking means on the support for engaging the rod when the pins are in operative position, means connecting the locking means to the corresponding ball joint of the pin to operate the locking means by a sudden displacement of the pin whereby the weight is allowed to raise the pin, means for raising the weights to bring the rod into engagement with the locking means and the pins into operative position, and means for adjustably carrying the platform whereby pins of varying sizes may be used.

11. In a ten-pins game, the combination of an alley, a support, means carrying the support above the alley, means associated with the support and carrying means for adjusting the support relative to the alley, a plurality of pins, a jointed rod for each pin projecting through the support, a ball joint making detachable the jointed rod and the corresponding pin, a weight associated with each pin and normally tending to raise the same from the alley toward the support, locking means on the support engaging the jointed rod and preventing the weight from raising the pin when the same is on the alley, means connecting the locking means to the ball joint of the pin for actuating the locking means by a sudden displacement of the pin on its joint, means for raising the weights, and means for indicating the position of the pins.

12. In a ten-pins game, a plurality of pins, a jointed rod for each pin, a weight overbalancing the jointed rod and pin, locking means for engaging the rod when the pin is in operative position, and a member connecting the locking means to the pin so that a sudden displacement of the pin from its operative position actuates the locking means and releases the rod, causing the weight to raise the pin to the inoperative position.

EMIL SCHLOSSBERG.